(12) United States Patent
Eggeling et al.

(10) Patent No.: US 11,352,827 B2
(45) Date of Patent: Jun. 7, 2022

(54) SWINGING DOOR SENSOR DEVICE

(71) Applicant: Pepperl+Fuchs GmbH, Mannheim (DE)

(72) Inventors: Markus Eggeling, Teltow (DE); Reinhard Strauch, Berlin (DE); Stephan Bartsch, Berlin (DE)

(73) Assignee: PEPPERL+FUCHS GMBH, Mannheim (DE)

( * ) Notice: Subject to any disclaimer, the term of this patent is extended or adjusted under 35 U.S.C. 154(b) by 91 days.

(21) Appl. No.: 16/649,114

(22) PCT Filed: Sep. 28, 2018

(86) PCT No.: PCT/DE2018/200089
§ 371 (c)(1),
(2) Date: Mar. 19, 2020

(87) PCT Pub. No.: WO2019/072344
PCT Pub. Date: Apr. 18, 2019

(65) Prior Publication Data
US 2020/0291713 A1  Sep. 17, 2020

(30) Foreign Application Priority Data
Oct. 11, 2017 (DE) ...................... 10 2017 218 102.8

(51) Int. Cl.
*E05F 15/73* (2015.01)
*G01S 17/04* (2020.01)
(Continued)

(52) U.S. Cl.
CPC ............. *E05F 15/73* (2015.01); *G01S 17/04* (2020.01); *E05F 2015/765* (2015.01); *G01S 7/4815* (2013.01); *G01S 17/08* (2013.01)

(58) Field of Classification Search
CPC ..... E05F 15/73; E05F 2015/765; E05F 15/43; E05F 15/611; E05F 2015/434;
(Continued)

(56) References Cited

U.S. PATENT DOCUMENTS

| 4,851,746 A | 7/1989 | Milke |
| 2013/0269255 A1 | 10/2013 | De Coi et al. |

FOREIGN PATENT DOCUMENTS

| DE | 10 2008 044 990 B4 | 8/2014 |
| EP | 1 375 808 A2 | 6/2003 |

OTHER PUBLICATIONS

German Examination Report dated Sep. 14, 2018 issued in related German Patent Application No. 10 2017 218 102.8; filed Oct. 11, 2017.
(Continued)

*Primary Examiner* — Jennifer D Bennett
(74) *Attorney, Agent, or Firm* — Gordon Rees Scully Mansukhani, LLP (57) ABSTRACT

The invention relates, among other things, to a door sensor device (20) for mounting on a door element (10), more particularly a swing door, which can be rotated about an axis of rotation (D), having at least one transmission device (21) for generating at least one monitoring beam (S) in the direction of the floor, said beam being oriented at an angle to the door leaf plane (E) of the door element (10), at least one receiving device (22) for receiving reflected or back-scattered radiation, and an evaluation device (23) for evaluating the radiation received by the receiving device (22) and generating an object detection signal. According to the invention, the evaluation device (23) is designed such that it checks whether a predefined exclusion condition is met, wherein the exclusion condition is dependent on at least three values, specifically an angle value specifying the rotational angle of the door element (10), a maximum value
(Continued)

predefined for the evaluation device (23), said maximum value specifying a fixed, maximum permitted rotational angle of the door element (10), and a measuring-point-specific advance angle value, which specifies the angle between a section which is bounded by the measuring point (M1-Mn) formed by the monitoring beam (S) on the floor and the axis of rotation (D) of the door element (10), and the door leaf plane (E).

21 Claims, 8 Drawing Sheets

(51) Int. Cl.
*G01S 7/481* (2006.01)
*G01S 17/08* (2006.01)

(58) Field of Classification Search
CPC ........ G01S 17/04; G01S 7/4815; G01S 17/08; G01S 17/42; G01S 17/93; E05Y 2400/53; E05Y 2400/532; G01D 5/28
See application file for complete search history.

(56) References Cited

OTHER PUBLICATIONS

International Search Report dated Jan. 21, 2019 issued in related International Patent Application No. PCT/DE2018/200089; filed Sep. 28, 2018.

SWINGING DOOR SENSOR DEVICE

The invention relates to a door sensor device for installation on a door element that can turn about an axis of rotation, in particular a swing door, with at least one transmitting device for generating at least one monitoring beam in the direction of the floor and aligned at an angle to the door leaf plane of the door element, at least one receiving device for receiving reflected or back-scattered radiation and an evaluation device for evaluating the radiation received by the receiving device and generating an object detection signal.

Such a door sensor device is described in German patent specification DE 10 2008 044 990 B4.

The invention is based on the object of providing a door sensor device that allows reliable operation while requiring little installation effort.

This object is achieved according to the invention by a door sensor device with the features according to patent claim 1.

Advantageous designs of the door sensor device according to the invention are specified in subclaims.

It is therefore provided according to the invention that the evaluation device is designed in such a way that it checks whether a predefined exclusion condition is fulfilled, wherein the exclusion condition is dependent on at least three values, specifically on an angle value specifying the respective rotational angle of the door element, on a maximum value predefined for the evaluation device, which specifies a fixed predefined maximum permissible rotational angle of the door element, and on a measuring-point-specific advance angle value, which specifies the angle between a line segment delimited by the respective measuring point formed by the monitoring beam on the floor and the axis of rotation of the door element and the door leaf plane.

An essential advantage of the door sensor device according to the invention can be seen in the fact that, once it has been installed, it can be operationally ready, without the necessity for a prior trial run. This is specifically attributable to the fact that the achievement of a predefined protection zone limit that the door element must not reach or exceed when it pivots can be detected by the sensor solely on the basis of the three values provided according to the claim.

As explained further below, the angle value and the measuring-point-specific advance angle values can be recorded by means of dedicated sensors of the door sensor device; alternatively, they can be input during the parameterization of the door sensor device.

The angle value specifying the respective rotational angle of the door element may be measured by the door sensor device itself, measured by another sensor and transmitted to the door sensor device or be transmitted as a manipulated variable by a drive pivoting the door element.

It is advantageous if the monitoring beam or beams form(s) measuring points on the floor, for which the evaluation device evaluates the received radiation, and, for those measuring points for which the exclusion condition is fulfilled, the evaluation device rejects received radiation of those measuring points, evaluates it in a modified way or switches off the transmitting device.

In the case of a variant of an embodiment that is considered to be particularly advantageous, it is provided that the monitoring beam or beams form(s) measuring points on the floor, for which the evaluation device evaluates the received radiation, the evaluation device notionally displaces the height of the measuring points for which the exclusion condition is fulfilled upward from the floor, and the evaluation device evaluates the received radiation with respect to the measuring point notionally displaced upward from the floor. The upward displacement of the measuring point is preferably performed in such a way that the displaced measuring point lies at the protection zone limit, to be precise at a vertical distance from the floor.

Preferably, when it evaluates the received radiation with respect to the measuring point notionally displaced upward from the floor, the evaluation device takes into account the received radiation exclusively for a radiating region that extends from the door sensor device up to the measuring point displaced upward from the floor.

The evaluation device will preferably determine the height of the measuring point notionally displaced upward from the floor according to:

$$Hci = f(\theta, H, \gamma, \gamma\ \max, Xi) = H \cdot \left(1 - \frac{Xi \cdot \tan(\gamma\ \max - \gamma)}{H \cdot \tan(\theta)}\right)$$

where

Hci denotes the height of the it measuring point notionally displaced upward from the floor, $\gamma$ denotes an angle value specifying the respective rotational angle of the door element, $\gamma$ max denotes the maximum value that specifies the fixed predefined maximum permissible rotational angle of the door element, $\theta$ denotes the emitting angle value, which specifies the emitting angle between the monitoring beam or beams and the door leaf plane, H denotes a height value that specifies the fitting height of the door sensor device on the door element above the floor, and Xi denotes a measuring-point-specific distance value that specifies the radial distance of the respective ith measuring point from the axis of rotation of the door element.

It is also advantageous if the evaluation device determines the length of the radiating path up to the measuring point notionally displaced upward from the floor according to:

$$Li = f(\theta, \gamma, \gamma\ \max, Xi) = \frac{Xi \cdot \tan(\gamma\ \max - \gamma)}{\sin(\theta)}$$

where $\gamma$ denotes an angle value specifying the respective rotational angle of the door element, $\gamma$ max denotes the maximum value that specifies the fixed predefined maximum permissible rotational angle of the door element, $\theta$ denotes the emitting angle value, which specifies the emitting angle between the monitoring beam or beams and the door leaf plane, Li denotes the length of the radiating path and Xi denotes a measuring-point-specific distance value that specifies the radial distance of the respective measuring point from the axis of rotation of the door element, and the evaluation device exclusively takes into account received radiation that has, as a maximum, covered twice the length of the radiating path Li.

The evaluation device preferably considers the exclusion condition to be fulfilled for those measuring points for which the sum of the angles obtained from the angle value and the measuring-point-specific advance angle value reaches or exceeds the maximum value.

The evaluation device preferably determines the measuring-point-specific advance angle value by taking a height value that specifies the fitting height of the door sensor device on the door element above the floor, an emitting angle value that specifies the emitting angle between the monitoring beam or beams and the door leaf plane, and a measuring-point-specific distance value that specifies the distance of the respective measuring point from the axis of rotation of the door element.

The evaluation device preferably determines the measuring-point-specific advance angle value according to $$\beta i = \arctan\left[\frac{H}{Xn}\tan\theta\right]$$

βi denotes the advance angle value, θ denotes the emitting angle value, H denotes the height value and Xi denotes the measuring-point-specific distance value.

The door sensor device preferably measures its fitting height itself and consequently preferably determines the height value itself.

Alternatively or in addition, it may be provided that the door sensor device has an input interface, which allows an external input of the height value.

With regard to the measuring-point-specific distance values, it is regarded as advantageous if the evaluation device determines the measuring-point-specific distance value of at least one measuring point on the basis of a starting value and a measuring-point-specific relative value, wherein the starting value specifies the distance of the measuring point closest to the axis of rotation of the door element from the axis of rotation and wherein the measuring-point-specific relative value specifies the distance of the at least one measuring point from the measuring point closest to the axis of rotation of the door element.

It may also be advantageous if the evaluation device determines the measuring-point-specific distance values on the basis of a starting value that specifies the distance of the measuring point closest to the axis of rotation from the axis of rotation of the door element, a raster value, which specifies the raster spacing between the measuring points, and a measuring-point-specific raster position of the respective measuring point.

The door sensor device preferably measures its distance from the axis of rotation itself and/or likewise preferably determines the starting value itself.

Alternatively or in addition, the door sensor device may have an input interface, which allows an external input of the distance of the door sensor device from the axis of rotation and/or the starting value.

The said raster value is preferably stored in the door sensor device.

The door sensor device preferably determines the emitting angle value itself.

It is also advantageous if the door sensor device has an input interface, which allows an external input of the emitting angle value.

The transmitting device preferably has a multiplicity of individual emitters, which are arranged on a notional emitter line and respectively form a measuring points and preferably together generate a light grid.

Alternatively, but similarly advantageously, the transmitting device may be a scanning device, which scans the region in front of the door element along a scanning line while forming a multiplicity of measuring points, wherein the length of the scanning line and/or the number of evaluated measuring points is dependent on how many measuring points are rejected in dependence on the at least three values.

The door sensor device is preferably a light sensor.

The invention additionally relates to a door element, in particular a swing door. It is provided according to the invention that the latter is equipped with a door sensor device as described above.

With respect to the advantages of the door element according to the invention, reference should be made to the statements made above in connection with the door sensor device according to the invention.

The invention additionally relates to a method for operating a door sensor device which is suitable for installation on a door element that can turn about an axis of rotation, in particular a swing door, wherein at least one monitoring beam is directed at the floor and aligned at an angle to the door leaf plane, reflected or back-scattered radiation is received and received radiation is evaluated and an object detection signal is formed.

With respect to such a method, it is provided that it is checked whether a predefined exclusion condition is fulfilled, wherein the exclusion condition is dependent on at least three values, specifically on an angle value specifying the respective rotational angle of the door element, on a maximum value predefined for the evaluation device, which specifies a fixed predefined maximum permissible rotational angle of the door element, and on a measuring-point-specific advance angle value, which the angle is formed between a line segment delimited by the respective measuring point formed by the monitoring beam on the floor and the axis of rotation of the door element and the door leaf plane.

With respect to the advantages of the method according to the invention, reference should be made to the statements made above in connection with the door sensor device according to the invention.

The invention is explained more specifically below on the basis of exemplary embodiments; by way of example here FIG. 1 shows an exemplary embodiment of a door sensor device according to the invention, which is installed on a door element, wherein FIG. 1 shows a frontal view of the door element, FIG. 3 shows the door sensor device and the door element according to FIGS. 1 and 2 in a view from above, wherein FIG. 3 shows a closed state of the door element.

For the sake of clarity, the same reference signs are always used for identical or comparable components in the figures.

Figure 1:
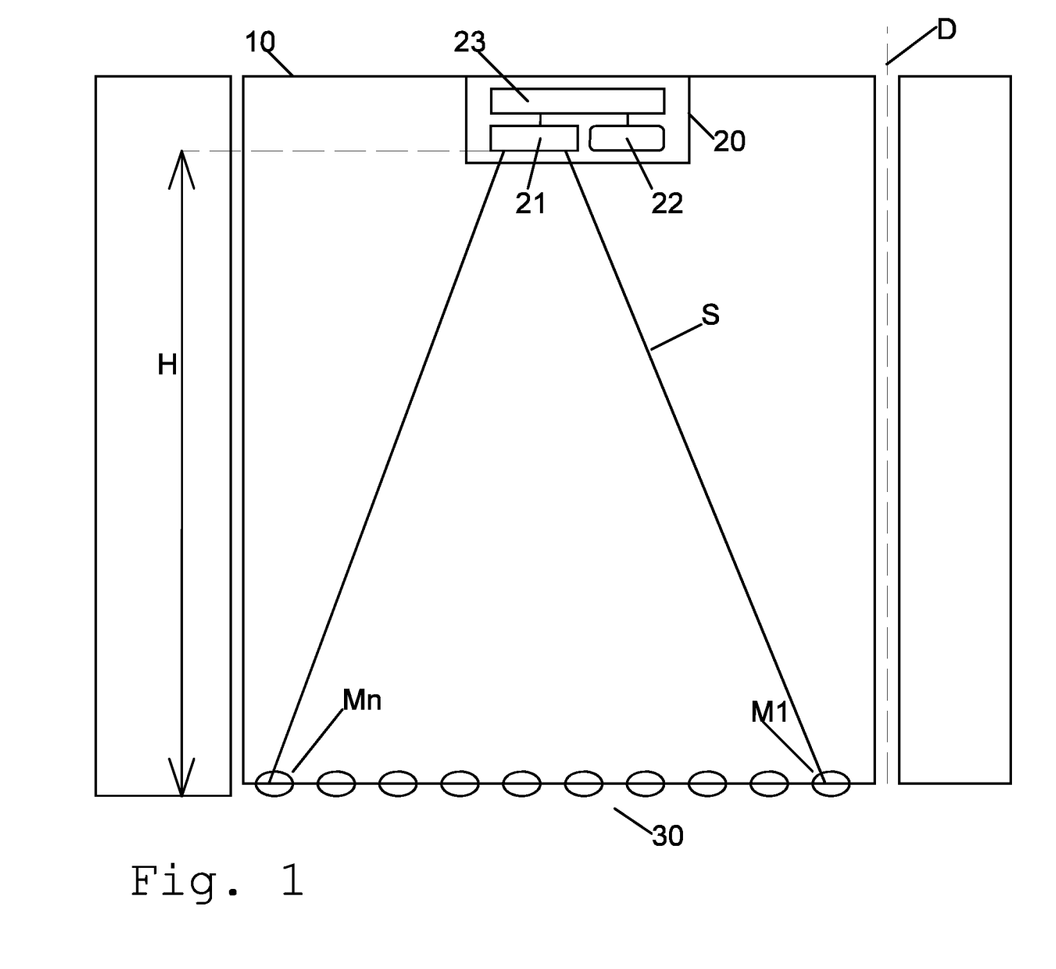

FIG. 1 shows in a frontal representation a door element 10, which can turn about an axis of rotation D. The door element 10 may be for example a swing door. The door element 10 is equipped with a door sensor device 20, which comprises a transmitting device 21, a receiving device 22 and an evaluation device 23.

The transmitting device 21 of the door sensor device 20 generates one or more monitoring beams S, which form measuring points M1 to Mn on a floor 30. In the case of the exemplary embodiment according to FIG. 1, ten measuring points are shown by way of example, and so here n=10. It goes without saying that the number of measuring points should be understood as only given by way of example.

If there is an object in the region of the measuring beam or beams S, the evaluation device 23 will detect this on the basis of the radiation received by the receiving device 22, for example the intensity of the radiation or the distance of the point of reflection and/or scattering formed by the object. In the case of a detected object, the evaluation device 23 generates an object detection signal that indicates a detected object, and otherwise a signal or object detection signal that indicates no detected object.

A height value, which specifies the fitting height of the door sensor device 20 on the door element 10 above the floor 30, is identified in FIG. 1 by the reference sign H.

Figure 2:
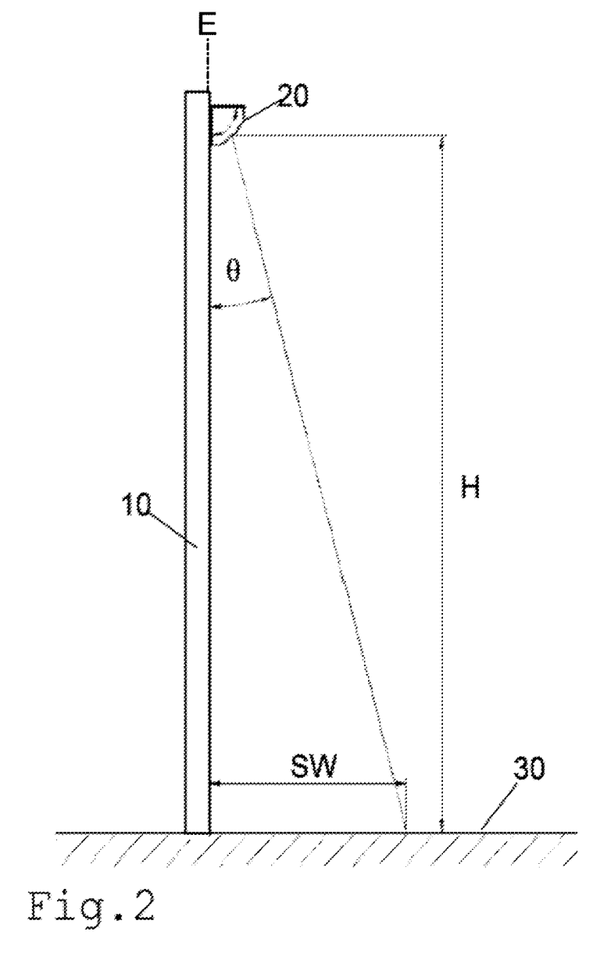
FIG. 2 shows the door element according to FIG. 1 with the door sensor device installed on it, looking toward the end edge of the door element.

FIG. 2 shows the door element 10 with the door sensor device 20 installed on it in a view looking toward the end edge remote from the axis of rotation D according to FIG. 1 (main closing edge). It can be seen that the transmitting device 21 emits the monitoring beam or beams S at an emitting angle in relation to the door leaf plane E. The emitting angle or the emitting angle value is identified in FIG. 2 by the reference sign $\theta$.

The emitting angle or the emitting angle value $\theta$ defines a protection zone width SW, which specifies the spatial distance between each of the measuring points and the door element 10. The protection zone width SW is calculated as follows:

$$SW = H \tan \theta.$$

The emitting angle $\theta$ relative to the door leaf plane E or the protection zone width SW gives a measuring-point-specific advance angle between each of the measuring points and the door leaf plane E.

Figure 3:
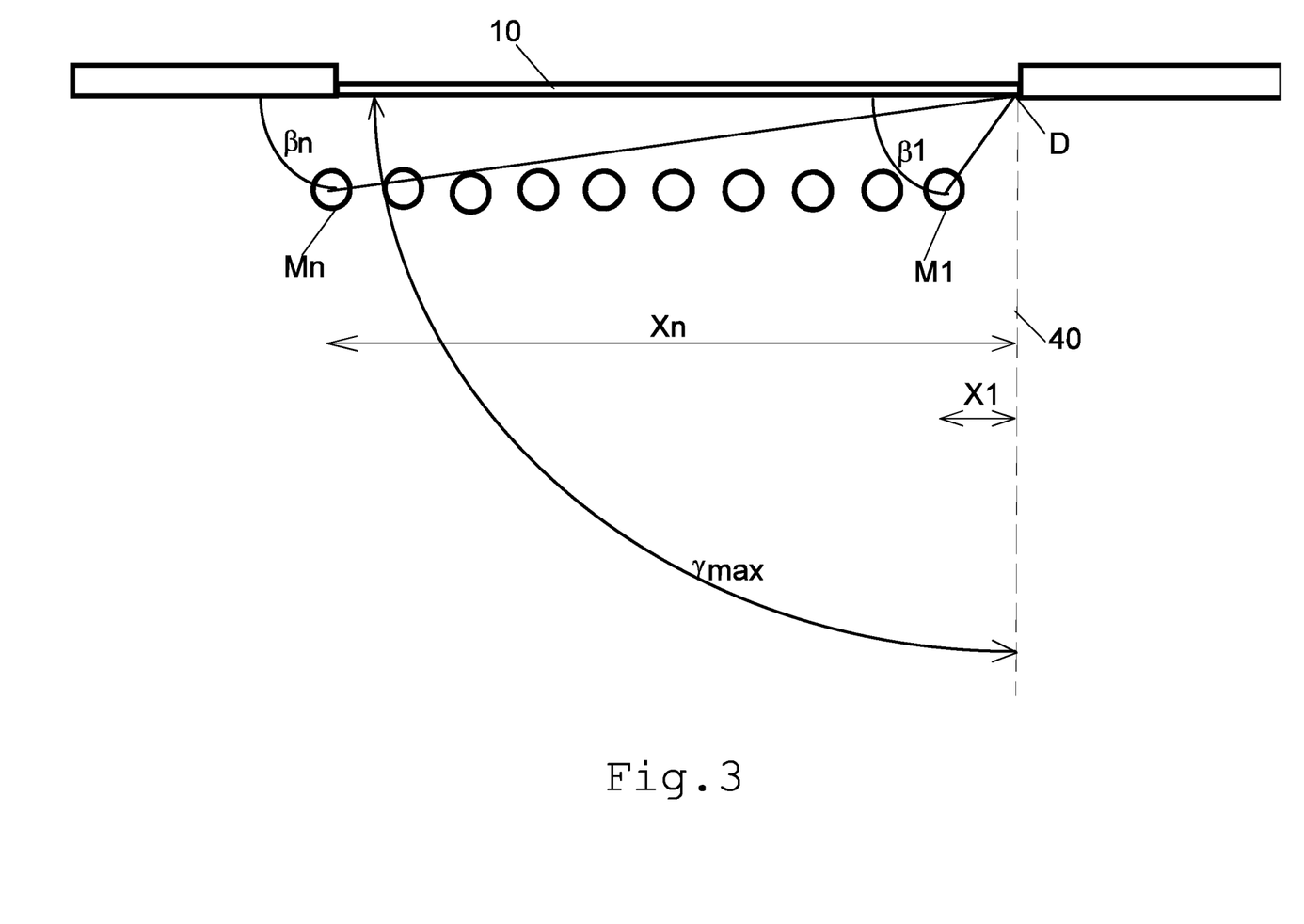

FIG. 3 shows more specifically in detail the advance angles of the measuring points M1 to Mn in the example of the first measuring point M1 and the nth measuring point Mn. The advance angles or advance angle values of the measuring points M1 and Mn are identified in FIG. 3 by the reference signs $\beta 1$ and $\beta n$.

For the n measuring points M1 to Mn, the advance angle values can be determined as follows:

$$\beta i = \arctan\left[\frac{H}{Xi}\tan \theta\right] \text{ with } 1 \leq i \leq n$$

where $\beta i$ denotes the advance angle value of the ith measuring point ($1 \leq i \leq n$), $\theta$ denotes the emitting angle value, H denotes the height value and Xi denotes the distance value of the ith measuring point from the axis of rotation D.

Thus, if in the case of the representation according to FIG. 3 the door element 10 is opened and turned in the direction of a predefined protection zone limit 40, the measuring points M1 to Mn will reach the protection zone limit 40 at different points in time or at different rotational angles $\gamma$ of the door element. Specifically, because of its largest advance angle $\beta 1$, the first measuring point M1 will reach the protection zone limit 40 first, whereas, because of its smaller advance angle $\beta n$, the nth measuring point Mn is the last measuring point to reach the protection zone limit 40.

In the case of the exemplary embodiment according to FIG. 3, the protection zone limit 40 lies at a rotational angle of the door element of 90°; this should be understood as only given by way of example; the protection zone limit 40 may also lie at a different, that is to say smaller or larger, rotational angle of the door element.

Figure 4:
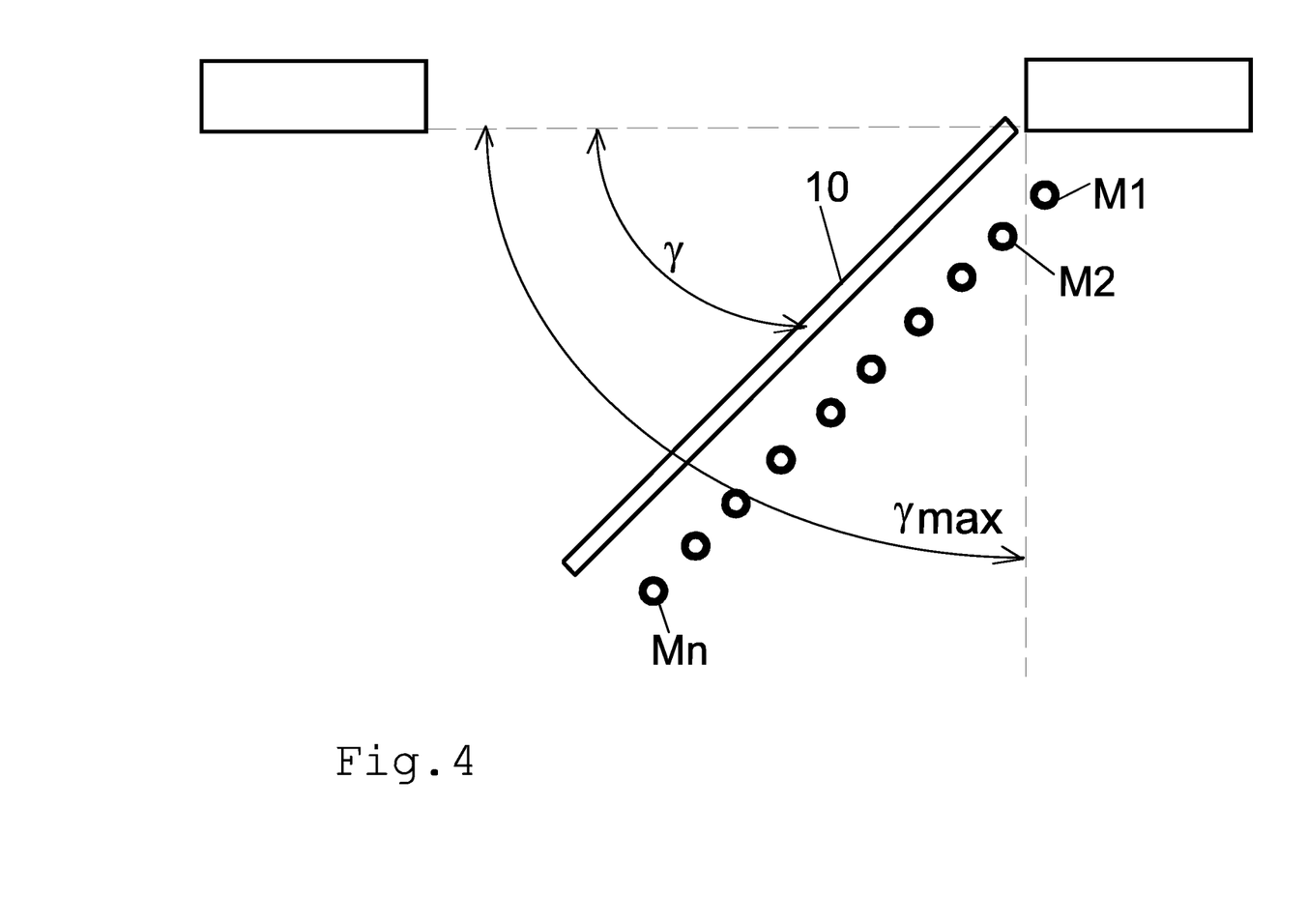
FIG. 4 shows the door element according to FIGS. 1 to 3 when opening the door element and when pivoting the door element in the direction of a predefined protection zone limit.

FIG. 4 shows the door element 10 in a partially open state. The rotational angle of the door element 10 or its angle value is identified in FIG. 4 by the reference sign $\gamma$. A maximum value, which specifies a fixed predefined maximum permissible rotational angle $\gamma$ of the door element 10, and consequently the angular position of the protection zone limit 40, is identified in FIG. 4 by the reference sign $\gamma$ max.

It can be seen in FIG. 4 that—as already explained in connection with FIG. 3—the measuring points M1 to Mn reach the protection zone limit 40 at different rotational angles $\gamma$ of the door element 10. In the case of the representation according to FIG. 4, the first measuring point M1 is already past the protection zone limit 40, the second measuring point M2 lies exactly at the protection zone limit 40.

In the case of the door sensor device 20 according to FIGS. 1 to 4, the evaluation device 23 is designed in such a way that it performs the evaluation or the type of evaluation of the radiation received by the measuring points M1 to Mn in dependence on whether or not a predefined exclusion condition is fulfilled.

It is advantageous if the evaluation device 23 considers the exclusion condition to be fulfilled for those measuring points Mi for which the sum of angles obtained from the angle value $\gamma$, which specifies the respective rotational angle of the door element 10, and the measuring-point-specific advance angle value $\beta i$, which defines the advance angle value of the respective measuring point Mi, reaches or exceeds the maximum value $\gamma$ max, which specifies the maximum permissible rotational angle of the door element 10. Specifically, the evaluation device 23 will therefore consider the exclusion condition to be fulfilled for those measuring points Mi ($1 \leq i \leq n$), for which the following applies:

$$\gamma + \beta i \geq \gamma \text{ max}$$

In dependence on the fulfillment or non-fulfillment of the exclusion condition, the evaluation device 23 may make use of, reject or evaluate in some other way received radiation of the respective measuring point Mi. For example, the evaluation device 23 may disregard or reject the received radiation of those measuring points for which the exclusion condition is fulfilled.

Alternatively, the evaluation device 23 may make use of or evaluate the received radiation of those measuring points for which the exclusion condition is fulfilled in some other way than for those measuring points for which the exclusion condition is not fulfilled. This is to be explained more specifically below in connection with FIG. 5 by way of example.

Figure 5:
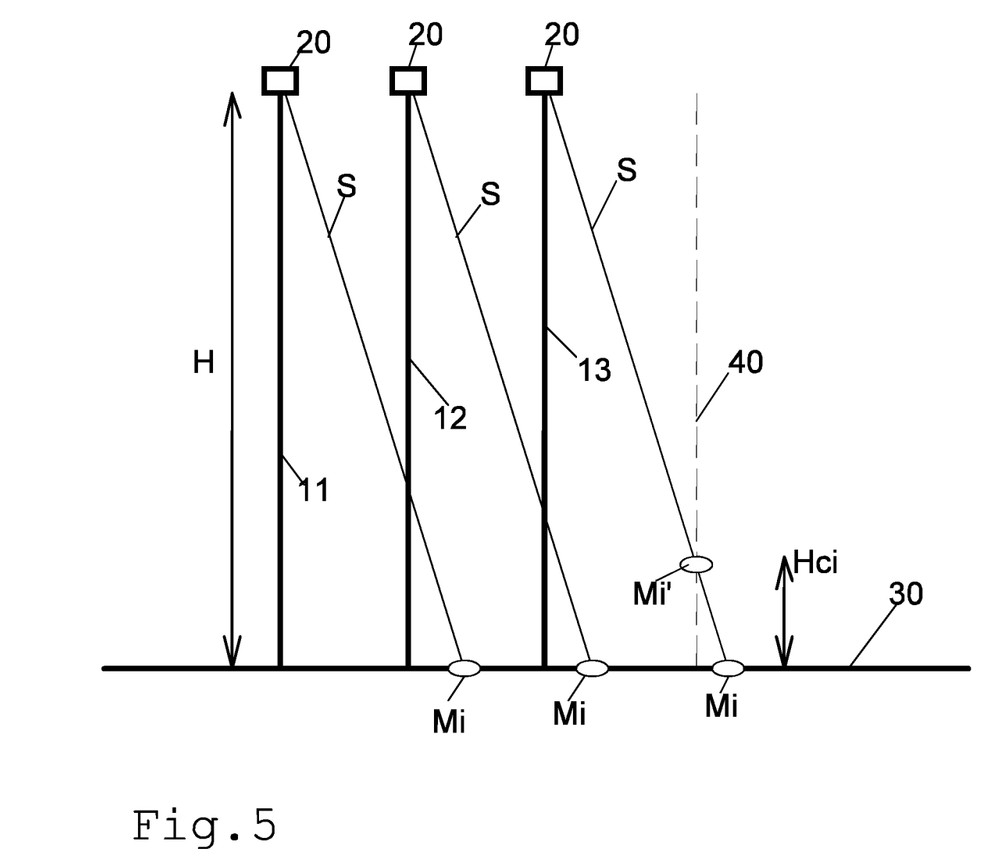
FIG. 5 shows by way of example a possible operating mode of the door sensor device for the case where the latter is intended to evaluate received radiation with respect to a measuring point notionally displaced upward from the floor.

FIG. 5 shows by way of example the door element 10 in a view looking toward the end edge of the door element 10 at different opening angles of the door element:

With the reference sign 11, the door element is shown in the closed position shown in FIG. 1.

The reference sign 12 shows the door element in a position in which the ith measuring point Mi has not yet reached the protection zone limit 40.

The reference sign 13 shows the door element after the measuring point Mi has already passed the protection zone limit 40 as a result of the turning about the axis of rotation D. It can therefore be seen in FIG. 5 that the measuring point Mi lies beyond the protection zone limit 40.

The evaluation device 23 can detect the exceeding of the protection zone limit 40 by checking the exclusion condition:

$$\gamma + \beta i \geq \gamma \text{ max ?}$$

Since this exclusion condition is fulfilled in the case of the position of the door element identified by the reference sign 13, the evaluation device 23 will notionally displace the measuring point Mi upward, to be precise in such a way that the notionally displaced measuring point Mi' lies exactly on the protection zone limit 40 above the floor 30.

The notionally displaced measuring point Mi' consequently no longer lies on the floor 30, but instead is at a height with respect to the floor 30 that is identified in FIG. 5 by the reference sign Hci. The height of the notionally upwardly displaced measuring point Mi' can be calculated as follows:

$$Hci = f(\theta, H, \gamma, \gamma \text{ max}, Xi) = H \cdot \left(1 - \frac{Xi \cdot \tan(\gamma \text{ max} - \gamma)}{H \cdot \tan(\theta)}\right)$$

where Hci denotes the height of the ith measuring point notionally displaced upward from the floor and Xi denotes a measuring-point-specific distance value that specifies the radial distance of the respective ith measuring point from the axis of rotation D of the door element (see FIG. 3).

Thus, once the evaluation device 23 has determined the height Hci of the notionally upwardly displaced measuring point Mi', it may evaluate the radiation coming from this displaced measuring point Mi' exclusively for a radiating region that extends from the door sensor device 20 up to the displaced measuring point Mi'. For example, the evaluation device 23 may determine the length Li of the radiating path up to the measuring point Mi' notionally displaced upward from the floor 30 according to:

$$Li = f(\theta, \gamma, \gamma \text{ max}, Xi) = \frac{Xi \cdot \tan(\gamma \text{ max} - \gamma)}{\sin(\theta)}$$

Thus, the evaluation device 23 may for example exclusively take into account that received radiation that has, as a maximum, covered twice the length of the radiating path Li.

It is for example possible for received radiation to be taken into account in dependence on the length Li of the radiating path if the evaluation device 23 evaluates the delay time that elapses from the emission of the monitoring beam S by the transmitting device 21 to the reception of the received radiation by the receiving device 22. Alternatively or in addition, it may be provided that the receiving device 22 is a distance sensor, which can determine the distance of received radiation, and consequently allows the evaluation device 23 to exclusively make use of received radiation up to the displaced measuring point Mi'.

Figure 6:
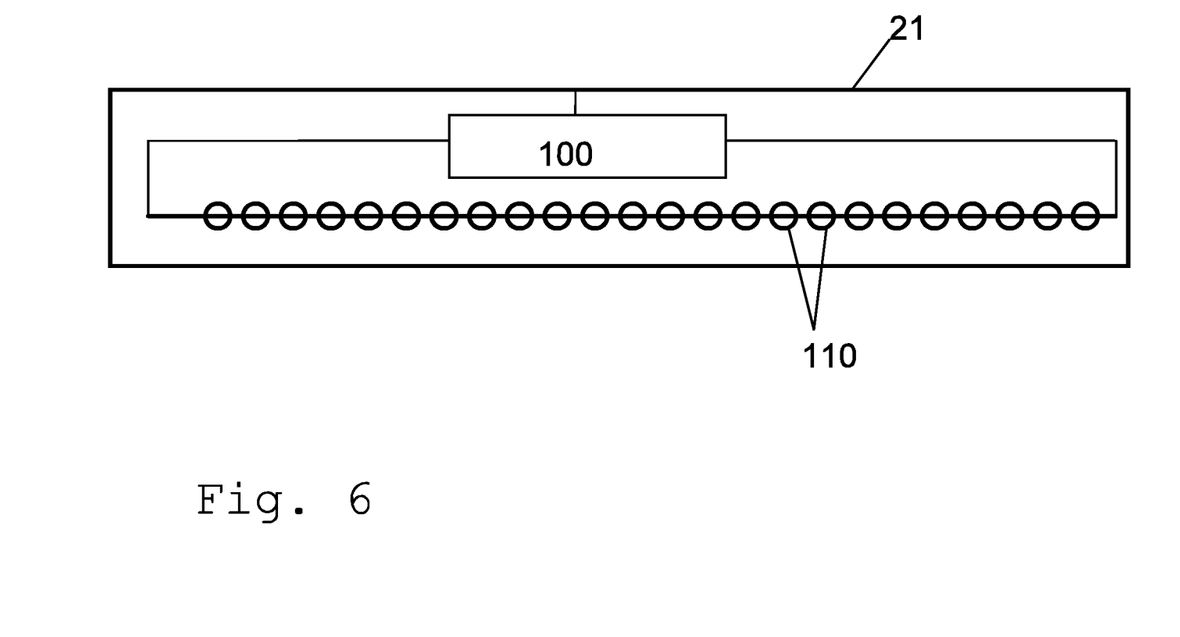
FIG. 6 shows an exemplary embodiment of a transmitting device that can be used in the case of the door sensor device according to FIGS. 1 to 5.

FIG. 6 shows an exemplary embodiment of a transmitting device 21 that can be used in the case of the door sensor device 20 according to FIGS. 1 to 5. The transmitting device 21 has a power source 100, which is in connection with a multiplicity of light emitters 110 and can feed power to them. The light emitters may be for example light-emitting diodes, in particular infrared light-emitting diodes.

In the case of the exemplary embodiment, the light emitters 110 are arranged along a straight emitter line, so that the measuring points M1 to Mn shown in FIGS. 1 to 5 and likewise lying on a line can be generated.

Figure 7:
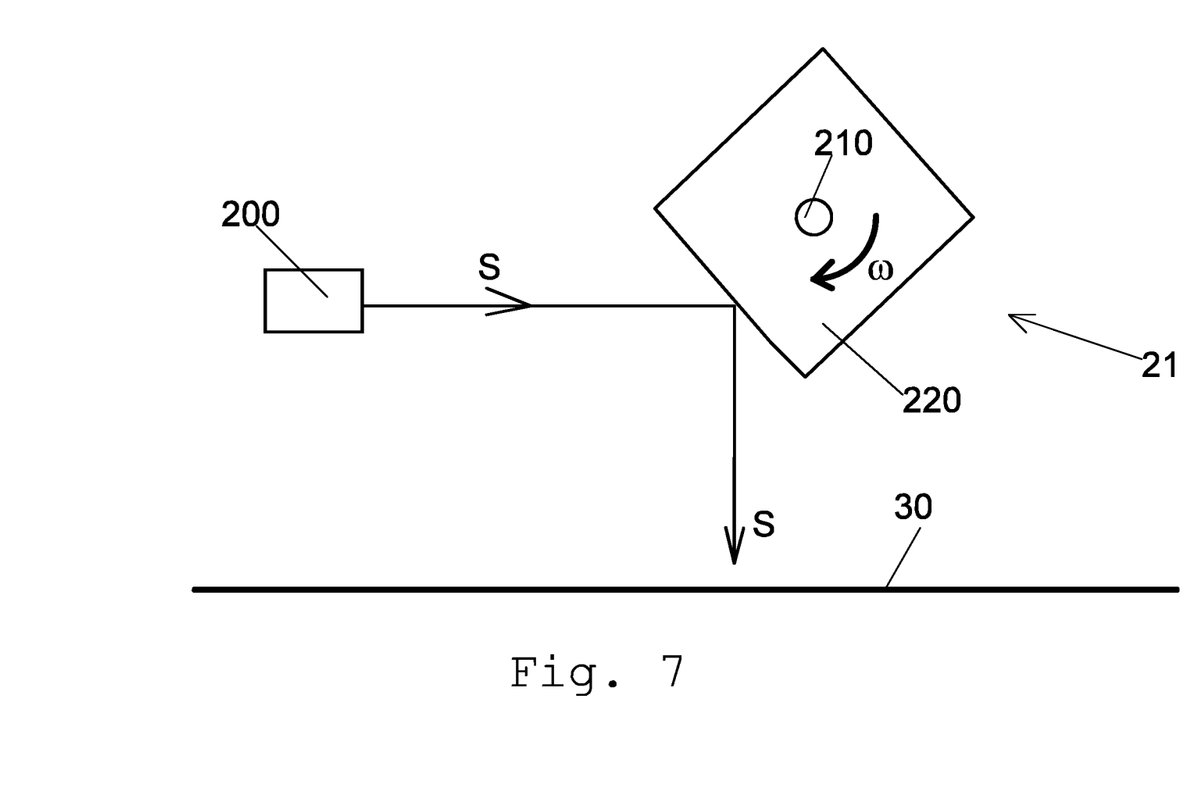
FIG. 7 shows a further exemplary embodiment of a transmitting device that can be used in the case of the door sensor device according to FIGS. 1 to 5.

FIG. 7 shows a further exemplary embodiment of a transmitting device 21 that can be used in the case of the door sensor device 20 according to FIGS. 1 to 5. The transmitting device 21 has a light emitter 200 and a deflecting mirror 220, which rotates about an axis 210 and deflects the radiation generated by the light emitter 200 according to its respective rotational angle position co. The transmitting device 21 according to FIG. 7 consequently forms a scanning arrangement, which scans the region in front of the door element 10 along a scanning line while forming a multiplicity of measuring points. The length of the scanning line or the number of evaluated measuring points that are evaluated by the evaluation device 23 may for example be made dependent on how many measuring points are to be evaluated or rejected—in dependence on the fulfillment or non-fulfillment of the exclusion condition.

Figure 8:
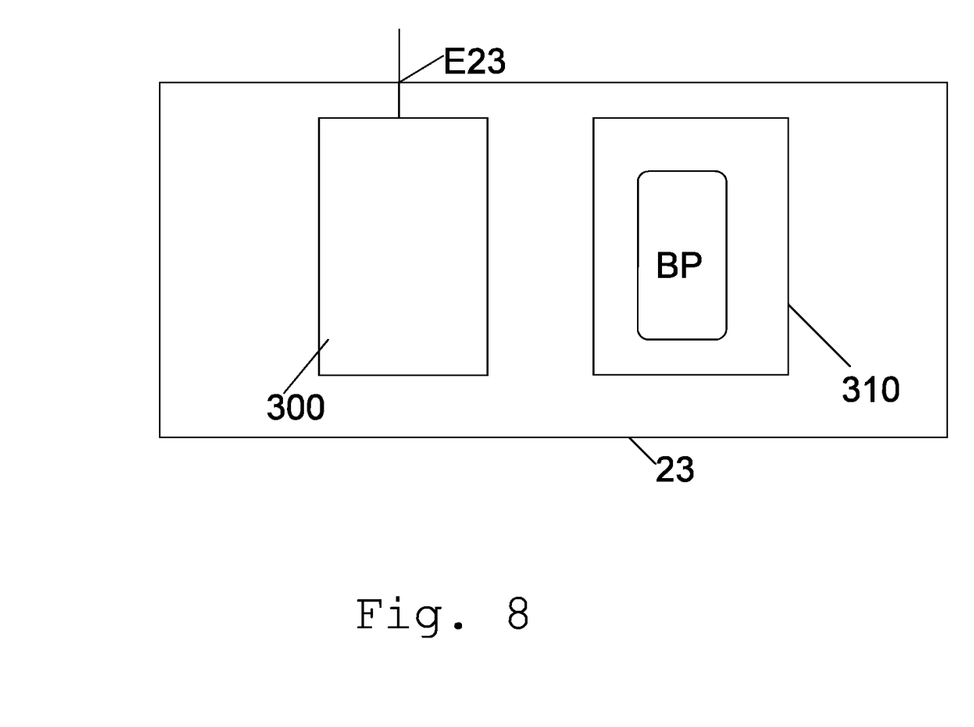
FIG. 8 shows an exemplary embodiment of an evaluation device that can be used in the case of the door sensor device according to FIGS. 1 to 5.

FIG. 8 shows an exemplary embodiment of an evaluation device 23 that can be used in the case of the door sensor device 20 according to FIGS. 1 to 5. The evaluation device 23 comprises a computing device 300 and a memory 310. Stored in the memory 310 is an operating program BP, which defines the operation of the computing device 300 and allows the computing device 300 to operate in the way described above and to check the exclusion condition.

One or more of the following values for example may be stored in the memory 310:
- the angle value $\gamma$ specifying the respective rotational angle of the door element,
- the maximum value $\gamma$ max, which specifies the fixed predefined maximum permissible rotational angle of the door element, and consequently the position of the protection zone limit 40,
- the emitting angle value $\theta$, which specifies the emitting angle between the monitoring beam or beams S and the door leaf plane E,
- the height value H, which specifies the fitting height of the door sensor device 20 on the door element 10 above the floor 30, and
- the measuring-point-specific distance values X1-Xn, which specify the radial distance of the respective measuring point from the axis of rotation D of the door element 10.

The angle value $\gamma$, the emitting angle value $\theta$, the height value H and the measuring-point-specific distance values X1-Xn may be determined by the door sensor device 20 itself, by means of dedicated sensors, and be stored in the memory 310.

If the measuring points are equidistant, it is advantageous if the evaluation device 23 determines the measuring-point-specific distance values of the measuring points M2-Mn on the basis of a starting value and a measuring-point-specific relative value. The starting value is for example the distance value X1 between the measuring point M1 and the axis of rotation D, and the measuring-point-specific relative value is for example a raster value, which specifies the raster spacing between the measuring points.

Alternatively, the aforementioned values or individual values of those mentioned above may be input from outside at an input interface E23 and be stored in the memory 310 in the course of a parameterization of the door sensor device 20 at the time of installation.

The input interface E23 additionally allows in the course of the parameterization of the door sensor device 20 at the time of the installation the input of the maximum value γ max, which defines the fixed predefined maximum permissible rotational angle of the door element 10, and consequently the position of the protection zone limit 40 according to FIG. 4.

Although the invention has been more specifically illustrated and described in detail by preferred exemplary embodiments, the invention is not restricted by the disclosed examples and other variations may be derived from them by a person skilled in the art without departing from the scope of protection of the invention.

LIST OF REFERENCE SIGNS

10 Door element
11 Closed position of the door element
12 Slightly open position of the door element
12 Wide-open position of the door element
20 Door sensor device
21 Transmitting device
22 Receiving device
23 Evaluation device
30 Floor
40 Protection zone limit
100 Power source
110 Light emitter
200 Light emitter
220 Deflecting mirror
300 Computing device
310 Memory
D Axis of rotation
E Door leaf plane
E23 Input interface
H Height value
Hci Height
Li Length
M1-Mn Measuring points
Mi Measuring point
Mi' Measuring point
S Monitoring beams
SW Protection zone width
E Door leaf plane
θ Emitting angle value
β1, βi Advance angle values
γ Angle value
γ max Maximum value
ω Rotational angle position

The invention claimed is:

1. A door sensor device (20) for installation on a door element (10) that can turn about an axis of rotation (D), in particular a swing door, with
at least one transmitting device (21) for generating at least one monitoring beam (S) in the direction of the floor (30) and aligned at an angle to a door leaf plane (E) of the door element (10),
at least one receiving device (22) for receiving reflected or back-scattered radiation and
an evaluation device (23) for evaluating the radiation received by the receiving device (22) and generating an object detection signal,
wherein the evaluation device (23) is designed in such a way that the evaluation device checks whether a predefined exclusion condition is fulfilled, wherein the exclusion condition is dependent on at least three values, specifically
on an angle value specifying the respective rotational angle of the door element (10),
on a maximum value predefined for the evaluation device (23), which specifies a fixed predefined maximum permissible rotational angle of the door element (10), and
on a measuring-point-specific advance angle value, which specifies the angle between a line segment delimited by the respective measuring point (M1-Mn) formed by the monitoring beam (S) on the floor (30) and the axis of rotation (D) of the door element (10) and the door leaf plane (E); and
the monitoring beam or beams (S) form measuring points (M1-Mn) on the floor (30), for which the evaluation device (23) evaluates the received radiation,
the evaluation device (23) notionally displaces the height of the measuring points (M1-Mn) for which the exclusion condition is fulfilled upward from the floor (30), and
the evaluation device (23) evaluates the received radiation with respect to the measuring point notionally displaced upward from the floor (30).

2. The door sensor device (20) as claimed in claim 1, wherein
the monitoring beam or beams (S) form measuring points (M1-Mn) on the floor (30), for which the evaluation device (23) evaluates the received radiation, and
for those measuring points (M1-Mn) for which the exclusion condition is fulfilled, the evaluation device (23) rejects the received radiation of those measuring points (M1-Mn), evaluates the received radiation in a modified way or switches off the transmitting device (21).

3. The door sensor device (20) as claimed in claim 1, wherein when the evaluation device evaluates the received radiation with respect to the measuring point notionally displaced upward from the floor (30), the evaluation device (23) takes into account the received radiation exclusively for a radiating region that extends from the door sensor device (20) up to the measuring point displaced upward from the floor (30).

4. The door sensor device (20) as claimed in claim 1, wherein the evaluation device (23) determines the height of the measuring point notionally displaced upward from the floor (30) according to:

$$Hci = f(\theta, H, \gamma, \gamma \max, Xi) = H \cdot \left(1 - \frac{Xi \cdot \tan(\gamma \max - \gamma)}{H \cdot \tan(\theta)}\right) \quad (1 \le i \le n)$$

where
Hci denotes the height of the ith measuring point (Mi) nationally displaced upward from the floor (30),
γ denotes an angle value specifying the respective rotational angle of the door element (10),
γ max denotes the maximum value, which specifies the fixed predefined maximum permissible rotational angle of the door element (10),
θ denotes the emitting angle value, which specifies the emitting angle between the monitoring beam or beams (S) and the door leaf plane (E),
H denotes a height value, which specifies the fitting height of the door sensor device (20) on the door element (10) above the floor (30), and Xi denotes a measuring-point-specific distance value, which specifies the radial distance of the ith measuring point (Mi) from the axis of rotation (D) of the door element (10).

5. The door sensor device (20) as claimed in claim 1, wherein the evaluation device (23) determines the length of the radiating path up to the measuring point (Mi') notionally displaced upward from the floor (30) according to:

$$Li = f(\theta, \gamma, \gamma \max, Xi) = \frac{Xi \cdot \tan(\gamma \max - \gamma)}{\sin(\theta)}$$

where
- γ denotes an angle value specifying the respective rotational angle of the door element (10),
- γ max denotes the maximum value, which specifies the fixed predetermined maximum permissible rotational angle of the door element (10),
- θ denotes the emitting angle value, which specifies the emitting angle between the monitoring beam or beams (S) and the door leaf plane (E),
- Li denotes the length of the radiating path and
- Xi denotes a measuring-point-specific distance value, which specifies the radial distance of the respective measuring point (M1-Mn) from the axis of rotation (D) of the door element (10),
and
the evaluation device (23) exclusively takes into account received radiation that has, as a maximum, covered twice the length of the radiating path Li.

6. The door sensor device (20) as claimed in claim 1, characterized in that the evaluation device (23) considers the exclusion condition to be fulfilled for those measuring points (M1-Mn) for which the sum of the angles obtained from the angle value and the measuring-point-specific advance angle value reaches or exceeds the maximum value.

7. The door sensor device (20) as claimed in claim 1, characterized in that the transmitting device (21) has a multiplicity of individual emitters, which are arranged on a notional emitter line and respectively form a measuring points (M1-Mn).

8. The door sensor device (20) as claimed in claim 1, characterized in that the transmitting device (21) is a scanning device, which scans the region in front of the door element (10) along a scanning line while forming a multiplicity of measuring points (M1-Mn), wherein the length of the scanning line and/or the number of evaluated measuring points (M1-Mn) is dependent on how many measuring points (M1-Mn) are rejected in dependence on the at least three values.

9. The door sensor device (20) as claimed in claim 1, characterized in that the door sensor device (20) is a light sensor.

10. A door element (10), in particular a swing door, characterized in that the door element (10) is equipped with the door sensor device (20) of claim 1.

11. A door sensor device for installation on a door element that can turn about an axis of rotation, in particular a swing door, with
- at least one transmitting device for generating at least one monitoring beam in the direction of the floor and aligned at an angle to the door leaf plane of the door element,
- at least one receiving device for receiving reflected or back-scattered radiation and
- an evaluation device for evaluating the radiation received by the receiving device and generating an object detection signal, wherein the evaluation device is designed in such a way that the evaluation device checks whether a predefined exclusion condition is fulfilled, wherein the exclusion condition is dependent on at least three values, specifically
- on an angle value specifying the respective rotational angle of the door element,
- on a maximum value predefined for the evaluation device, which specifies a fixed predefined maximum permissible rotational angle of the door element, and
- on a measuring-point-specific advance angle value, which specifies the angle between a line segment delimited by the respective measuring point (M1-Mn) formed by the monitoring beam on the floor and the axis of rotation of the door element and the door leaf plane the evaluation device (23) determines the measuring-point-specific advance angle value by taking
- a height value that specifies the fitting height of the door sensor device (20) on the door element (10) above the floor (30),
- a emitting angle value that specifies the emitting angle between the monitoring beam or beams (S) and the door leaf plane (E), and
- a measuring-point-specific distance value that specifies the distance of the respective measuring point (M1-Mn) from the axis of rotation (D) of the door element (10).

12. The door sensor device (20) as claimed in claim 11, characterized in that the evaluation device (23) determines the measuring-point-specific advance angle value according to $$\beta i = \arctan\left[\frac{H}{Xn}\tan\theta\right]$$

βi denotes the advance angle value, θ denotes the emitting angle value, H denotes the height value and Xi denotes the measuring-point-specific distance value.

13. The door sensor device (20) as claimed in claim 11, characterized in that the door sensor device (20) measures its fitting height itself and determines the height value itself.

14. The door sensor device (20) as claimed in claim 11, characterized in that the door sensor device (20) has an input interface, which allows an external input of the height value.

15. The door sensor device (20) as claimed in claim 11, characterized in that
the evaluation device (23) determines the measuring-point-specific distance value of at least one measuring point (M1-Mn) on the basis of a starting value and a measuring-point-specific relative value,
wherein the starting value specifies the distance of the measuring point (M1-Mn) closest to the axis of rotation (D) of the door element (10) from the axis of rotation (D) and
wherein the measuring-point-specific relative value specifies the distance of the at least one measuring point (M1-Mn) from the measuring point (M1-Mn) closest to the axis of rotation (D) of the door element (10).

16. The door sensor device (20) as claimed in claim 11, characterized in that the evaluation device (23) determines the measuring-point-specific distance values on the basis of a starting value that specifies the distance of the measuring point (M1-Mn) closest to the axis of rotation (D) from the axis of rotation (D) of the door element (10), a raster value, which specifies the raster spacing between the measuring points (M1-Mn), and a measuring-point-specific raster position of the respective measuring point (M1-Mn).

17. The door sensor device (20) as claimed in claim 11, characterized in that the door sensor device (20) measures its distance from the axis of rotation (D) itself and/or determines the starting value itself.

18. The door sensor device (20) as claimed in claim 11, characterized in that the door sensor device (20) has an input interface, which allows an external input of the distance of the door sensor device (20) from the axis of rotation (D) and/or the starting value.

19. The door sensor device (20) as claimed in claim 11, characterized in that the raster value is stored in the door sensor device (20).

20. The door sensor device (20) as claimed in claim 11, characterized in that the door sensor device (20) determines the emitting angle value itself.

21. The door sensor device (20) as claimed in claim 11, characterized in that the door sensor device (20) has an input interface, which allows an external input of the emitting angle value.

* * * * *